United States Patent
Izumi

(10) Patent No.: US 6,948,170 B2
(45) Date of Patent: Sep. 20, 2005

(54) COMPUTER AND COMPUTER-READABLE STORAGE MEDIUM FOR COMMAND INTERPRETATION

(76) Inventor: Hiroshi Izumi, 2977, Ogiso, Kiso-Mura, Kiso-Gun, Nagano 399-6203 (JP)

( * ) Notice: Subject to any disclaimer, the term of this patent is extended or adjusted under 35 U.S.C. 154(b) by 883 days.

(21) Appl. No.: 09/754,536

(22) Filed: Jan. 4, 2001

(65) Prior Publication Data

US 2001/0016866 A1 Aug. 23, 2001

(30) Foreign Application Priority Data

Feb. 21, 2000 (JP) ...................................... 2000-042195

(51) Int. Cl.[7] ................................................ G06F 9/46
(52) U.S. Cl. ..................................... 718/100; 718/102
(58) Field of Search ................................ 718/100, 102, 718/103, 104, 106, 107, 101

(56) References Cited

U.S. PATENT DOCUMENTS 5,321,828 A * 6/1994 Phillips et al. ................ 703/28
5,551,030 A * 8/1996 Linden et al. .............. 707/102

OTHER PUBLICATIONS

A Command Interpreter for Ada, Thomas J. Wheeler, Computer Reaserch Div., CENTACS, DRSEL–TCS–CR, CECOM Ft. Monmouth N. J. 07730, Jan. 1984 ACM SIGAda Letters, vol. III Issue 4.*

On the Structure and Control of Commands, C.J. Stephenson, Stanford University, Jan. 1973, ACM SIGOPS Opoerating System Review, Proceedings of the forth ACM symposium on Operating System Principals, vol. 7, Issue 4.*

A high–Level Programming and Command Language, Christopher W. Fraser, David R. Hanson, Department of Computer Science The University of Arizona, Tucson, Arizona 85721, Jan. 1983, Proceedings of the 1983 ACM SIGPLAN symposium on Programming Language . . .*

* cited by examiner

*Primary Examiner*—Majid Banankhah
(74) *Attorney, Agent, or Firm*—Wood, Phillips, Katz, Clark & Mortimer

(57) ABSTRACT

In accordance with the present invention, there is provided a computer incorporating a multitasking operating system such as a UNIX-based OS, wherein recursively invokable function calling statements and flow control statements in a procedure-oriented high-level programming language are incorporated as shell external commands stored in a directory of a file system with an active path. With this arrangement, programming can be achieved simply by combining some of the external commands, so that highly sophisticated programming comparable to C programming can be achieved without the use of flow control statements incorporated in a shell. Since the flow control statements and the function calling statements are incorporated as the shell external commands, a loop and a conditional branch are executed by daughter processes individually generated. Even if forceful exit from the loop occurs, only the daughter process controlling the loop is forcefully terminated, but a parent process executing the program is still active so that the programmed process is subsequently continued.

12 Claims, 1 Drawing Sheet

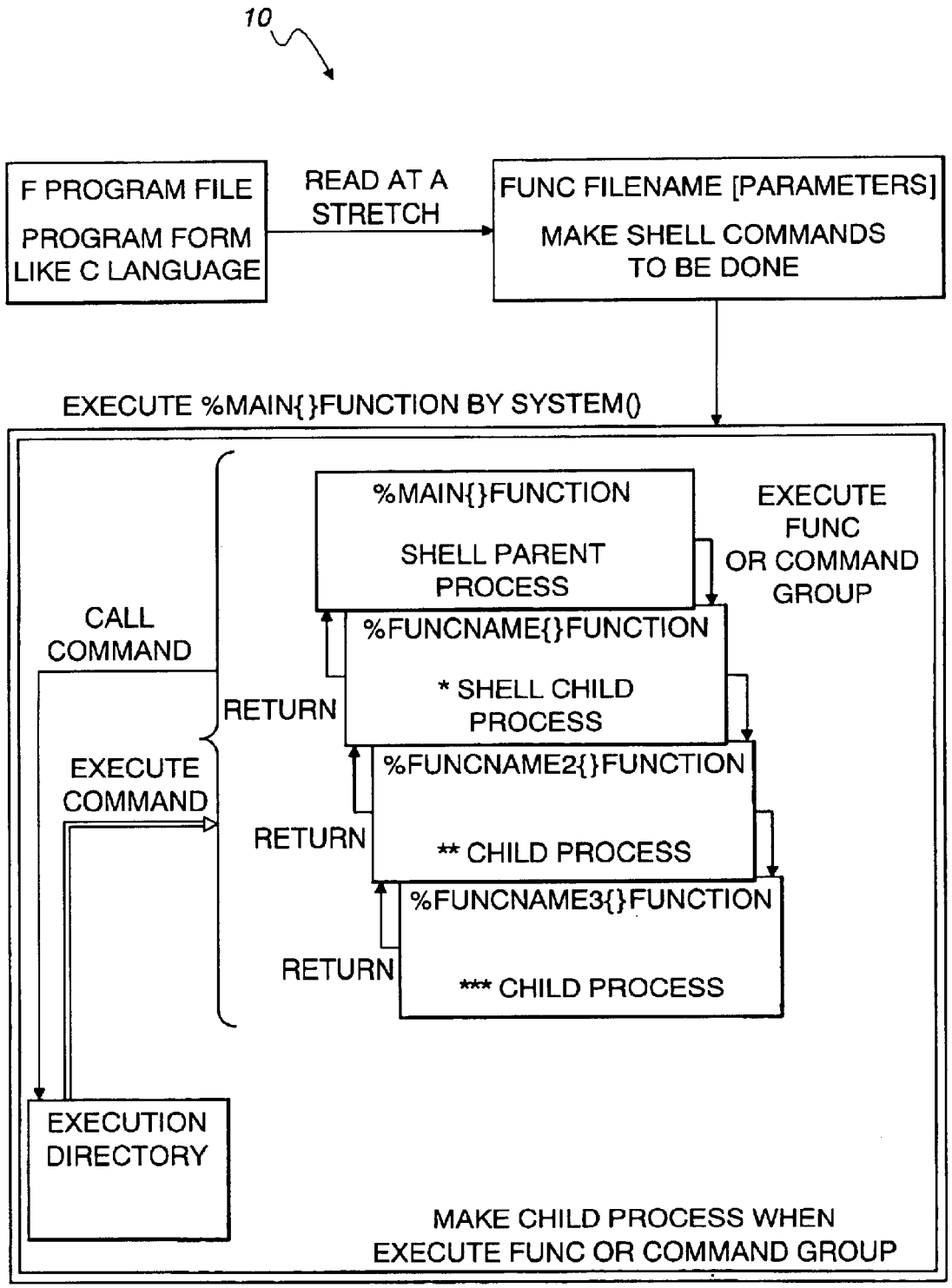

COMPUTER AND COMPUTER-READABLE STORAGE MEDIUM FOR COMMAND INTERPRETATION

BACKGROUND OF THE INVENTION

1. Field of the Invention

The present invention relates to a computer incorporating a UNIX-based operating system such as Linux, BSD, SystemV or OS-9 based on UNIX design concepts or other multitasking operating system having a command interpreter, and to a storage medium containing a function command program executable on such a computer.

2. Description of the Prior Art

UNIX (herein including Linux) is one of the most widespread operating systems, and includes a program called "kernel" which controls the most fundamental portion thereof, and an interactive command interpreter called "shell". When a user inputs a desired command from an input terminal such as a keyboard in response to a shell prompt to cause a computer to perform a desired operation, the shell interprets the inputted command to execute the command.

UNIX incorporates a variety of commands as standard. With UNIX, some of the basic commands are combined to create new commands for performing a little more complicated tasks, and these commands are further combined to create a command for performing a more advanced task. Conventionally, such an operation is widely performed by utilizing a shell script.

The shell script utilizes existing commands as elements of a high-level programming language for programming. The shell script is a file in which a set of commands are described, and serves as a program for providing instructions to the shell. In a UNIX shell script, an iteration statement and a branch statement can be used. Where a bash shell is employed, a function can be defined in the script. Therefore, the bash shell allows for shell programming comparable to programming in a high-level programming language such as C language, though the execution speed thereof is still unsatisfactory. Where the execution speed is not critical, UNIX programming is achieved by first creating a shell script and programming commands required to be executed at a high speed for larger size data processing in C language.

As described above, the bash shell allows for the function definition, thereby ensuring easier and sophisticated programming. However, a shell script incorporating the function definition cannot be used in other shells such as a Bourne shell (sh) and a C shell (csh).

In the case of the shell script, the iteration statement and the branch statement are implemented by a program incorporated in the shell, and the incorporated program is executed through a process of the shell script. Therefore, forceful exit from the program of these flow control statements (e.g., forceful termination by typing "^D") means forceful termination of the process executing the shell script program. Where the user is performing an operation with the use of the shell script, he may desire to forcefully exit from a loop programmed in the shell script and then continue to execute a command described therein. In the prior art shell programming, however, a flow control scheme for exiting from the loop should preliminarily be programmed in consideration of the above case.

It is therefore an object of the present invention to provide a programming environment based on a novel concept by implementing a function as a shell external command. It is another object of the invention to create a sophisticated program incorporating function definition without any additional feature of a shell used by a user, and to achieve programming in the same manner as in C language without modifying a conventional shell such as sh or sch. It is further another object of the invention to achieve flexible and powerful multitasking programming by taking advantage of all the features of an operating system available to the user.

SUMMARY OF THE INVENTION

In accordance with the present invention, there is provided a computer incorporating a multitasking operating system such as a UNIX-based OS, wherein recursively invokable function calling statements and flow control statements in a procedure-oriented high-level programming language are incorporated as shell external commands stored in a directory of a file system with an active path. With this arrangement, programming can be achieved simply by combining some of the external commands, so that highly sophisticated programming comparable to C programming can be achieved without the use of flow control statements incorporated in a shell. Since the flow control statements and the function calling statements are incorporated as the shell external commands, a loop and a conditional branch are executed by daughter processes individually generated. Even if forceful exit from the loop occurs, only the daughter process controlling the loop is forcefully terminated, but a parent process executing the program is still active so that the programmed process is subsequently continued.

A program file incorporating the statement commands according to the present invention may be implemented as a shell script or executed by an interpreter command newly generated. A final decision on how the program file is used is left to user's discretion. The inventor of the present invention recommends to use the following function command. The function command may serve as a kind of interpreter implementing the procedure-oriented high-level programming language, or as a kind of filter which is adapted to convert a program file (script character string) created in a predetermined format into a character string interpretable by a shell (command interpreter).

BRIEF DESCRIPTION OF THE DRAWING

FIG. 1 is a flow diagram illustrating the process flow for an embodiment of the present invention.

DETAILED DESCRIPTION OF THE PREFERRED EMBODIMENTS

The novel programming scheme according to the present invention can be utilized not only on UNIX-based operating systems but also on a variety of multitasking operating systems having a kernel and a command interpreter.

A computer according to one inventive aspect has an operating system including a kernel and a command interpreter installed therein, and is operative to run an external command program. The kernel is operative to manage at least a file system and a memory and perform a multitasking control. The command interpreter is operative to input thereto a command character string indicative of one or more commands and interpret the command character string to execute the respective commands in the command character string in accordance with a control scheme specified by the character string. The commands include external commands. The external command program is described in an executable file stored in a predetermined directory of the file system. The program is executable by a process generated therefor by the kernel. Execution of the process is controlled by the kernel. The command interpreter is implementable as one of the external commands. Further, the computer according to the invention incorporates a function command as one of the external commands. The function command is executable with a file name taken as an argument. When the function command is executed with the file name taken as the argument, a process executing the function command inputs a script character string described in a predetermined format in a file specified by the file name, then converts the script character string into a command character string interpretable by the command interpreter, and newly invokes the command interpreter to output the command character string to the command interpreter. The computer capable of incorporating such a function command can easily achieve flexible and powerful multitasking programming.

A computer according to another inventive aspect has an operating system including a kernel and a command interpreter installed therein, and is operative to run an external command program. The kernel is operative to manage at least a file system and a memory and perform a multitasking control. The command interpreter is operative to input thereto a command character string indicative of one or more commands and interpret the command character string to execute the respective commands in the command character string in accordance with a control scheme specified by the character string. The commands include external commands. The external command program is described in an executable file stored in a predetermined directory of the file system. The program is executable by a process generated therefor by the kernel. Execution of the process is controlled by the kernel. The command interpreter is implementable as one of the external commands. Further, the computer according to the invention incorporates a function command as one of the external commands. The function command is executable with a function index of a predetermined format taken as an argument. When the function command is executed with the function index taken as the argument, a process executing the function command inputs a script character string describing the entity of the function index preliminarily stored in a memory accessible by the process, then converts the script character string into a command character string interpretable by the command interpreter, and newly invokes the command interpreter to output the command character string to the command interpreter. With this arrangement, the process invoking the command constituting the entity of the function of the program is a daughter process of a process invoking a command constituting the entity (main function portion) of the program. Therefore, even if the execution of the function portion is forcefully terminated, the process executing the entity of the program including various commands such as the function command in combination is still active, so that the program can continuously be run.

A multitasking computer system according to further another inventive aspect is operative to run a program stored in an accessible file and described in a procedure-oriented high-level programming language having at least one function definition. The program has a command for executing the program and, when the program is executed by the command, generates a process for executing the entity of each function defined in the program. Usable as the programming language is an F language which will be described later, but any other high-level languages may be employed. A function command as described above may be used as the command. The program may be executed without the use of a command interpreter (e.g., UNIX shell).

A computer according to still another inventive aspect has an operating system including a kernel and a command interpreter installed therein, and is operative to run an external command program. The kernel is operative to manage at least a file system and a memory and perform a multitasking control. The command interpreter is operative to input thereto a command character string indicative of one or more commands and interpret the command character string to execute the respective commands in the command character string in accordance with a control scheme specified by the character string. The commands include external commands. The external command program is described in an executable file stored in a predetermined directory of the file system. The program is executable by a process generated therefor by the kernel. Execution of the process is controlled by the kernel. The command interpreter is implementable as one of the external commands. Further, the computer according to the invention incorporates a function command as one of the external commands. The function command is executable with a file name or a function index of a predetermined format taken as an argument. When the function command is executed with the file name taken as the argument, a process executing the function command inputs a main script character string described in a predetermined format in a file specified by the file name, then converts the main script character string into a command character string interpretable by the command interpreter, and newly invokes the command interpreter to output the command character string to the command interpreter. When the function command is executed with the function index taken as the argument, a process executing the function command inputs a function script character string describing the entity of the function index preliminarily stored in a memory accessible by the process, then converts the function script character string into a command character string interpretable by the command interpreter, and newly invokes the command interpreter to output the command character string to the command interpreter.

A typical example of the operating system is UNIX. However, the present invention is applicable to operating systems other than the UNIX.

The kernel may be a monolithic kernel or a micro kernel. Exemplary operating systems employing the monolithic kernel include Microsoft's Windows98, Apple's MacOS and Microware's OS-9. Exemplary operating systems employing the micro kernel include Be's BeOS, Microsoft's WindowsNT and Windows2000, Apple's NeXTSTEP/OPENSTEP, Rhapsody and MkLinux.

Examples of the command interpreter include UNIX-based shells, and command interpreters of Microsoft's MS-DOS and MS-Windows. The command interpreter is incorporated as standard in the OS or additionally incorporated in the computer.

The file system managed by the kernel may be constituted only by a resource such as a hard disk of a single computer or may be mounted with a network directory. Most of the operating systems employ a file system of a hierarchical structure (particularly, a tree structure), but the present invention can be implemented by employing a file system of a nonhierarchical structure.

A virtual memory system may be employed as a memory management system. The present invention can be implemented with an operating system, such as OS-9, which does not employ the virtual memory system to avoid deterioration of its performance due to swapping.

The multitasking scheme may be achieved either by preemptive multitasking or by nonpreemptive multitasking in which an execution right is transferred from one program to another program. A time sharing system is typically employed for controlling the preemptive multitasking. Alternatively, a multiprocessing operating system oriented to symmetrical multiprocessing (SMP) or non-symmetrical multiprocessing may be employed. In the symmetrical multiprocessing, a plurality of CPUs are operative on equality. The operating system automatically allocates tasks to the respective CPUs. In general, the operating system allocates a task to a CPU currently having the lowest load. In the non-symmetrical multiprocessing, one of the plurality of CPUs is regarded as a main CPU, and the other CPUs are regarded as sub-CPUs. Tasks of the operating system are allocated to the main CPU, while tasks of commands (applications and the like) are allocated to the sub-CPUs.

In the time sharing system, only a single process allocated the execution right is performed at a time point, even if a plurality of processes are active (particularly, in the case of a single processor).

In UNIX, a process is generated on the basis of a fork system call and, when a memory resource and a swap region resource are allocated, the process is brought into a ready (runnable) state. With input/output, the process is brought into a sleep (blocked or waiting) state. Upon completion of the input/output, the process is brought back into the ready state. When the process receives a STOP signal or issues a ptrace system call, the process is brought into a stop state. The process brought into the stop state in response to the STOP signal is brought back into the ready state when a CONT signal is applied thereto. The process stopped by the ptrace is restored by a ptrace. Further, the process issues an exit system call to terminate itself. To forcefully terminate the process, a kill signal is applied to the process. The process thus terminated (dead process) is brought into a zombie state. The process in the zombie state is completely eliminated when the parent process issues a wait system call. Where the parent process is terminated earlier than the daughter process, the kernel designates another process (generally, a process having a process ID of "1") as a foster parent of the daughter process (i.e., the attribute of the daughter process is rewritten). The ready state, the stop state and the sleep state herein mean that the process is in an active state.

In the ready state, the process can be executed in response to allocation of a CPU resource. In the multitasking system, a plurality of processes are generally in the ready state, but only the highest priority process is running. The other processes in the ready state are in a run queue, and sequentially allocated CPU resources.

While one example of the process control in UNIX has thus been described, the present invention can be implemented not only on the operating system which is capable of performing the aforesaid process control but also on operating systems which employ different process control schemes.

The command character string may be in any format. In the case of a UNIX shell, for example, the command character string may be a character string including a single command name and its argument, or a character string including a plurality of commands in combination. The command character string may include a command name, a command argument name, a command option specifier, and metacharacters of the shell. In the UNIX shell, the metacharacters permit a user to specify a control scheme for the execution of the respective commands, and to specify a control scheme for input/output between processes executing the respective commands.

Exemplary metacharacters are as follows:
Redirection < >>>
Pipe |
Command replacement "
Sequential command execution ;
Background process &
Command grouping ( )
Wildcard replacement *?[ ]
Variable specifying character $ In the UNIX shell, an internal field separator for separating commands is defined by a shell variable IFS, and examples thereof include a space, a tab character, and a line feed character. Of course, the aforesaid command character string includes these separator characters.

It is also possible to employ a command character string of a format predetermined in a command interpreter to be used.

When a process is created by the UNIX shell (e.g., csh, tcsh, bash or the like), jobs are simultaneously generated. A set of processes connected by the aforesaid pipes constitute a single job. The processes constituting the single job can be handled simultaneously. If CTRL-Z is inputted during execution of the job, the plurality of processes constituting the job can simultaneously be stopped. The present invention can advantageously be implemented on an operating system which is capable of controlling such a job constituted by a plurality of processes.

In the present invention, the entity of the function command is preferably stored as a binary file created by a compiler such as a C compiler in the file system. Where the CPU has a sufficiently high processing power, the entity of the function command may be stored as a text file processible by an interpreter such as a shell script. Further, it is merely necessary that the entity of the function command is stored in the file system at least at the startup of the operating system. In the case of an operating system employing a virtual disk system, for example, the function command may be taken in an actual memory or a virtual memory. However, it is not critical whether the entity of the function command is present on an external storage device or on the memory, as long as the command interpreter can handle the function command as an external command.

The function command may employ the file name and the function index as well as various invocation options as the argument. The function command is programmed so as to be executed in a file execution mode when it is invoked with the file name taken as the argument and to be executed in a function mode when it is invoked with the function index taken as the argument. The function command is programmed so as to perform an operation or a process predetermined for each of the options when the option is designated.

The function index as the argument may be a semantic function name, but preferably includes an addressing character string in hexadecimal specifying an address of the memory storing therein the entity of the function for easy access to the memory. Where the function index including the addressing character string is employed, a character which cannot be inputted from an input/output terminal such as a keyboard can be included in the function index for prevention of hacking or unauthorized access to the memory. An example of the character impossible to input is a cancel code (0×18). The format of the function index may be "% . . . FFFFFF( )", for example. Herein, '%' expresses a function to indicate that the function command is to be invoked in the function mode, and is useful to avoid confusion with a C program. Further, '.' is a cancel code (CAN). The string 'FFFFFF' is an addressing character string, and the argument to the function can be described in the last parentheses '( )'.

A program constituted by a script character string is described in the file specified as the argument of the function command. The script character string is a program which serves as a source of the command character string to be subjected to a predetermined process by the function command and outputted to the command interpreter. The program may be in any format, for example, in a format which is similar to the format in C language. The function command may be adapted to perform a preprocessor operation. Thus, the similarity to C language is increased, so that a user familiar with C language can easily create the program utilizing the function command. The function command may be adapted to handle a global variable and a local variable. The function command serves as a kind of filter to generate the aforesaid command character string interpretable by the command interpreter from the script character string in accordance with a predetermined rule.

The program constituted by the aforesaid script character string can be in the format which is fairly similar to C language, but its running state is far different from the running state of a C program or a shell script. The C program requires compiling before execution, while the program employing the function command according the present invention does not require compiling. The shell script is a set of command character strings directly interpretable by the shell. On the contrary, the script character string in the present invention can be expressed in any of various formats by the programming of the function command, so that the novel language fairly similar to C language can be provided as described above. Further, novel languages similar to Pascal and FORTRAN will be provided. A fundamental difference from the shell script is that a new process is generated for each function. This feature makes multitasking programming more flexible than the programming with the shell script.

The function script character string describing the entity of the function index is preliminarily stored in a predetermined memory before the function command employing the function index as the argument is invoked. In the case of OS-9, for example, the virtual memory system is not employed, but each process can access any physical memory space. Therefore, the process invoking the function command allocates a memory for storing the function script character string and, after storing the character string in that memory, invokes the function command. In the case of UNIX, on the other hand, the memory accessible by the process executing the command is allocated at the invocation or after the invocation, so that a memory allocated to another process is not accessible. Therefore, it is impossible to read out the character string stored in the predetermined memory by another process in an ordinary method before the invocation of the process. However, the multitasking operating systems generally incorporate certain inter-process communication schemes. Therefore, it is possible to apply the function script character string to the function command invoked with the function index taken as the argument through a proper inter-process communication scheme. One of these schemes can be achieved by a shared memory.

The main script character string constituting the program entity and the function script character string defining the function to be used in the program may be described in different files, or sequentially be described in a single file. Further, various definitions including initial definition and function definition can be described in different files by introducing #include as a preprocessor.

It is preferred that the computer according to the invention can write the main script character string and the function script character string in a file specified as the argument of the function command, so that the function name defined by the function script character string can be taken as the argument to describe the command name of the function command in these script character strings. When the function command is executed with the file name taken as the argument, the process executing the function command requests the kernel to allocate the shared memory for the inter-process communication, and the process stores in the allocated shared memory the function script character string described in the file specified as the argument of the function command. If the function name is described in the command character string before the command character string is outputted to the newly invoked command interpreter, the function name is replaced with a function index of the predetermined format specifying an address of the shared memory in which the function script character string associated with the function name is stored. This arrangement can be achieved mainly by incorporating these features in the function command (i.e., by programming to achieve these features).

The expression "before the command character string is outputted to the newly invoked command interpreter" may herein be understood as "before the process effectuating the output is invoked" and, in this case, a process (e.g., the parent process) of a higher level than the process effectuating the output converts the function name into the function index and stores the function script character string in the shared memory. Alternatively, the process effectuating the output (i.e., the function command invoked with the function index taken as the argument) may perform the conversion immediately before the output. In this case, the function name but not the function index is described in the function script character string stored in the shared memory.

The present invention can advantageously be embodied not only as the computer but also as a storage medium having the program of the function command stored therein for the computer. Further, the present invention can advantageously be embodied as a server or a transmission medium for providing the program of the function command over communication lines such as Internet.

More specifically, the present invention can advantageously be embodied as a computer-readable storage medium containing thereon a program of a function command interpretable by a command interpreter of an operating system, the function command being permitted to specify at least one argument at execution thereof, the program performing the steps of:

(1) determining whether the argument is a file name or a function index;

(2) if the argument is the file name, inputting a script character string including at least a main function portion and optionally a sub-function portion from a file specified by the file name, then converting the main function portion of the script character string into a command character string interpretable by the command interpreter and, if the sub-function portion is present in the script character string, storing the sub-function portion in a shared memory for inter-process communication, and newly invoking the command interpreter to output the command character string to the command interpreter;

(3) if the argument is the function index, reading the sub-function portion in a shared memory specified by the function index, then converting the sub-function portion into a command character string interpretable by the command interpreter, and newly invoking the command interpreter to output the command character string to the command interpreter. Examples of the storage medium include a CD-ROM, a CD-R, a CD-RW, a floppy disk, a hard disk, an MO disk, a Zip disk, a DVD-ROM, a DVD-RAM, and a super disk. The terms "main function portion" and "sub-function portion" correspond to the main script character string and the function script character string, respectively, in the case of the aforesaid computer according the invention.

The program of the function command is preferably created, for example, by means of a C or C++ compiler. The program may be recorded in the form of a source list or in a binary form after the compiling. If the storage medium is to be distributed for the redhat-based Linux, the program may be recorded in an rpm form. If the storage medium is to be distributed for the debian, the program may be recorded in a deb form.

In the storage medium according to the invention, an argument to be used by the program described in the form of script character string may additionally be described in the file name and the function index serving as the argument of the function command, and the function command may have a return value transferable to the command interpreter.

In the storage medium, a function name describable in the script character string can be defined in the sub-function portion, and the program for the function command may perform the step of, if the function name is described in the command character string before the command character string is outputted to the newly invoked command interpreter, replacing the function name with a function index of a predetermined format specifying an address of the shared memory in which a function script character string associated with the function name is stored.

Further, the present invention can be embodied as a computer having an UNIX-based operating system installed therein, wherein a recursively invokable function calling statement and a flow control statement in a procedure-orientated high-level programming language are incorporated as shell external commands stored in a directory of a file system with an active path, and may be embodied as a computer-readable storage medium containing thereon a program for a function command constituting the function calling statement to be incorporated in the computer.

Examples of the flow control statement include conditional branch statements (if statement, case statement and the like) and iteration statements (while statement, for statement, until statement and the like).

For example, an if command for the conditional branch statement may be programmed so as to be invoked by taking as arguments a character string providing an evaluation expression (or evaluation value) and a command character string to be executed at least if the evaluation expression is true. One exemplary if command is as follows:
if command
Format:
if[option] Control command 1 Command set 1
[else if[option] Control command 2 Command set 2]
[else Command set 3]

The contents enclosed in the brackets [ ] are herein omittable arguments.

When the if command is invoked, the control command 1 is first executed, and a return value of the command is regarded as an evaluation value. If the return value is true, the command set 1 is executed. If the return value of the control command 1 is false, the control command 2 is executed. If a return value of the control command 2 is true, the command set 2 is executed and, if false, the command set 3 is executed.

Since the if command is executed in a newly generated process unlike an if statement available in the shell script, a parent process having invoked the if command continues the execution even if the control command as the argument of the if command and the command set are forcefully terminated. Therefore, commands described subsequently to the if command can continuously be executed.

The incorporation of the function calling statement as a shell external command (hereinafter referred to as "func command") may be achieved by creating a script file for each function so that the func command is invoked with the script file taken as its argument. Alternatively, a main function portion and a sub-function portion may be described in a single script file so that, when the func command is invoked with the script file taken as its argument, a new process is generated in response to each function call to interpret the function portions and output a command character string to a shell.

In the present invention, each process executing a function is preferably designed so as to newly allocate a shared memory for storing therein a script character string to be executed by itself, and read the script character string from the memory to convert the script character string into a command character string.

The inventor of the present invention created a function command (func command) having the following feature in C language. A new language realized by the func command is referred to as "F language", which will hereinafter be described in detail. The following operations were performed by employing Linux as the OS, and Bash as the command interpreter. It is herein assumed that the function command has a file name of func, and the func command is stored in a directory (e.g., /usr/bin, /bin or the like) of a file system with an active path. The func command in this embodiment is operative in the following manner, and will easily be programmed in C language on the basis of the following description on the operation thereof by those skilled in the art. Further, those skilled in the art will be able to easily implement the computer and the storage medium according to the invention on the basis of the following description.

First, an F language program for printing "hello world" will be explained. This program is processed as a script character string according to the invention by the func command, and interpreted by a command shell.
%main($void)
{
  echo "hello, world!"
}

Since the F language is not a compiler like C language, compiling and linking operations are not required. The aforesaid program is inputted with the use of an appropriate editor such as vi or emcs, and stored with an appropriate file name assigned thereto. The file name is taken as an argument to execute the function command from the shell. Provided that the file name is "test", the aforesaid program can be run by key-inputting func 'test( )' in response to a shell prompt and pressing a return key. Unless the argument is enclosed in single quotation marks ' ', the Bash shell interprets the parenthesis characters ( ) subsequent to the file name as metacharacters indicative of a command group, resulting in a syntax error. By thus enclosing the entire character string including the file name and the parenthesis characters in the single quotation marks ' ', the func command can be executed with the character string test( ) taken as the argument. The same result can be provided by employing double quotation marks " " instead of the single quotation marks for enclosing the argument. In the case of the OS-9 shell, the parenthesis characters are not defined as metacharacters, so that the character string test( ) can be provided as the argument without the single quotation marks ' '. In the aforesaid case, the argument is not present and, therefore, func test and the file name can be taken as the argument for the execution.

When the aforesaid program is run, the func command reads the script character string from the program file, then converts the script character string into a command character string echo "hello, world!", and invokes a new shell as a daughter process to output the command character string to the shell. Then, the daughter shell interprets the command character string, and executes the echo command to output "hello, world!" on the terminal.

The F language program is started with a %main( ) function. Since the F language is fairly similar to C language, % is prefixed for prevention of confusion with C language. Subsequently, a parameter is described in parentheses ( ). The parameter is prefixed with $. The argument specified at the invocation of the func command is substituted in the parameter. Even if there is no argument transferred to the F program, the inside of the parentheses ( ) cannot be null (or omitted). Where no argument is transferred to the F program, ($void) is explicitly described as in the aforesaid case. As described previously, functions are independent of each other, so that an arbitrary parameter can be employed as long as the parameter does not overlap with the global variable.

The F language has the same preprocessor feature as C language. If #define printf echo is described in a library file myfile.h, the aforesaid test program can be described in the following manner similarly to C language. In this case, comments may be described in the program as in C language.
include <myfile.h>/* take in library information
*/
%main($void) { // define %main function with no argument
    printf"hello, world!"//execute command to print
}

Next, an F program for determining a greatest common divisor will be explained.
/* Greatest common devisor By Bash
file name: gcd
execution: func"gcb(a,b,NULL)"
a,b: some integer numbers
example: func"gcb(128,72,NULL)"
*/
include <myfile.h>
%main($a,$b,$call) {
return '$b==0'? 'echo "G.C.D=$a ($call times)"'\
: 'func"%main($b,$[$a % $b],$[$call+1])"';
}

Although the program looks as if it had the function of a ternary operator, the F language which is a set of commands as described above cannot be implemented without such commands. In this case, the function of the ternary operator is realized by making the following definition in myfile.h to use an if branch command.
define 'return X?Y:Z'"if'(X)' '(Y)'else'(Z)'"

With this #define preprocessor, the return statement is replaced with the if command, and upper-case characters are respectively replaced with a corresponding character string.

Although the F language is principally based on lower case characters, upper case characters are regarded as variables in the #define preprocessor.

When the F program for determining the greatest common divisor is run by the func command, the process of the func command requests the kernel to allocate a shared memory. The kernel allocates a shared memory of a specified size, and the process of the func command stores the F program in the allocated shared memory. Then, the program (script character string) is converted into the following command character string, which is in turn outputted to a daughter shell.
if'($b==0)' '(echo"G.C.D=$a ($call times)")'else'(func "%main($b,$a%$b), $[$call+1])"'

The daughter shell interprets the command character string, and executes the if command which is one of the external commands constituting the conditional branch statement in accordance with the aforesaid embodiment. The if command evaluates whether or not the parameter $b is zero. If true, the parameter $a is displayed as the greatest common divisor. If false, the func command for recursively executing the %main function is invoked as a daughter process. The process of the func command searches the script character string stored in the shared memory for the %main function, and reads the character string to repeat the aforesaid process. Where func %function is described in the command character string to be outputted to the shell, the func %function may be converted into a character string which specifies an address of the shared memory in which the entity of the function is stored, and the character string may then be outputted. In the aforesaid case, the command character string outputted to the daughter shell may be as follows:
if'($b==0)' '(echo"G.C.D=$a ($call times)")'else'(func "%shraddres($b,$a%$b), $[$call+1])"'

Herein, the shraddres is the address of the shared memory in which the %main function is stored, and represented in hexadecimal. By preliminary replacing the function name with the function index including the address specification, the func command invoked as the daughter process for the execution of the function need not search the shared memory for the entity of the function, so that system overhead can be reduced.

Next, an explanation will be given to the function definition in the F language. Functions in the F language are substantially the same as in C language. A significant difference is that the return value has only one type, i.e., a byte string (character string) which can be read in by a shell. A general format of the function is as follows:
%function-name(parameter declarations, if any)
{
declarations
statements
}
The name and parameters of the function are defined in the first line of the function definition, and the entity of the function is defined as script character strings in braces { }. Variables and the like are declared in the declarations. A command interpretable by the command shell, metacharacters defined by the shell, a character string defined by the preprocessor, and the like can be described in the statements.

A function %power for determining an n-th power and a main function %main for testing the %power function will be explained as exemplary functions. It is herein assumed that this F program has a file name of "power".
/* Power program by Bash
file name: power execution: func"power(m,n)"
```
/*
%main($m,$n)
{
echo -n "power($m,$n)=";
func"%power($m,1,$n)";
}
%power($m,$a,$n)
{
if'($n==0)'`{
echo $a;
}'else'{
func "%power($m,$[$m*$a],$[$n-1])"}'
}
```

A portion enclosed by braces { } subsequently to %main( ) is a main script character string (the main function portion of the script character string), and a portion enclosed by braces { } subsequently to %power is a function script character string (the sub-function portion of the script character string).

Parameters used in %power( ) are local parameters effective only in this function, and cannot be accessed from other functions as in the case of C language. Therefore, parameters having the same names as variables of the other functions can be used without any conflict with the variables. A value calculated from %power( ) can be returned to %main( ) by the echo command and the like. Of course, definition of a function having no return value is also possible.

When the F program is run, the func command process converts the program (script character strings) into character strings interpretable and executable by the shell, and stores the character strings in an allocated shared memory. The character strings stored in the shared memory are as follows. As herein explained, the braces {} enclosing the entity of the functions are replaced with parentheses ( ), and line feed codes in the respective functions are deleted. The entities of the functions are converted into a series of command character strings transferable to the shell.

```
%main($m,$n)
echo -n"power($m,$n)="; func"%power($m,1,$n)";
%power($m,$a,$n)
if'($n==0)' '(echo
$a;)'else'(func"%power($m,$[$m*$a], $[$n-1])")'
```

The func command invoked with the power file taken as an argument outputs the entity of the %main function portion as the command character string to the shell invoked as a daughter process. The daughter shell executes the echo command, and recursively invokes the func command as another daughter process with a function index to the %power function taken as an argument. The function index may be a function name or a pointer to the shared memory in which the %power function is stored.

Usable as the variables in the F language are global variables and local variables. The global variables are common to all the functions in the program. Since the global variables continuously exist as long as the %main( ) is operative, the global variables can be used for transaction of common data between the functions. On the other hand, the local variables are effective only in a specific function. The local variables are independent for each function, so that variables of the same name can independently be used in a plurality of functions. Declarations of the global variables precede %main( ). Further, the local variables are first declared in each of the script character strings describing the entities of the functions. This is because the declaration of the variables described in the midst of the program is regarded as a command in the program, so that the shell returns an error warning. The declarations of the variables may be in any format. An exemplary declaration format is as follows.

```
shared $const;//declaration of global variable
%main($void)
{
shared $a,$b;//declaration of local variables
...
}
```

The data types of the variables may include a byte string type and a pointer type. The variables of these data types are each represented by a variable name starting with $. Variables of byte string type are not permitted to freely change their values in the functions as in C language. Since the F language provides a set of commands and functions which serve as independent processes and employs an internal processing scheme such that a command character string of the entity of a function is outputted to the shell, the variables cannot be returned. Therefore, the declared value of a parameter of the function is processed as a constant byte string in the function before execution of the function. Accordingly, the use of the variables of byte string type is limited to declaration of arguments due to their nature.

To provide a data type which permits variables to freely change their values in the functions as in the C language, the pointer type variables are provided in the func command according to this embodiment. Allocation of a storage region in the shared memory permits the pointer type variables to freely change their values in the functions in the F language. The pointer type variables each have a name starting with shared, which is named from the implementation method. The global variables can be used as the highest speed transmission media for inter-process communication between commands constituting the functions. In the case of the local variables, a new storage region is allocated for each function in a process executing the function, so that independence of the local variables can be maintained.

In the F language, the functions are independent of each other and, hence, recursively utilized. In the case of the F language, when a function is recursively invoked, i.e., when func %function( ) is executed, the func command allocates a new shared memory, and copies a function script character string (which is a program to be processed by the func command) in the memory from the shared memory allocated by a parent process. Then, the func command executes the copied F program. That is, the process executing %function( ) is executed completely independently of the parent process. Thanks to this characteristic internal processing scheme, the recursively usable function is very useful. The F language can take advantage of the parallel processing which is a feature of the multitasking OS for drastic improvement of the computer environment. Since the F language provides a set of commands, a character & can be used for execution of the parallel processing in the F program, and %main( ) can recursively be invoked. The parallel invocation of the commands makes the respective processes completely independent of each other as described above, so that even the parent process can freely be brought into forceful termination. Thus, the F language allows for much more flexible programming for the parallel processing than the conventional shell programming. Although C language requires a highly advanced technique and turnover of conception for achieving this process, the F language can easily achieve the process only by setting &. Therefore, the time required for development of a program for improvement of a computer operation environment can drastically be reduced.

One exemplary program will be explained to show such an advantage. The following open_window command is an external command for opening a new window and executing a sub-shell in the window. The while command is an external command which has a control command as a first argument and, as long as the return value of the control command is true, executes a command set described as a second argument.

```
#include<myfile.h>
%main($directory) {
open_window {
while(func %menu($directory)) {
. . .
if -1 ($1=="drwx") {
func %main($9);
} else {
more $9&sleep 10;
}
}
}
echo "End of file searching.";
pause;
} &
}
%menu($direc) {
echo "Directory: $direc";
echo;
ls -l |printf("%s%s",#1,#9);
}
```

The F program obtains a file permission and its name by ls -l, and views the results in a window opened by the open_window command by way of a more command. If any directories are displayed, %main( ) is recursively invoked to open windows until there is no directory to be displayed. Therefore, the screen is filled with unnecessary windows. However, the respective windows are invoked in parallel with the use of &, so that overlapped unnecessary windows opened by the parent process can freely be removed.

It is noted that '&' should not be used in the func command itself where a function is to be recursively invoked. This is because the execution of the func command transfers an execution right to the parent process so that the entity of the function specified as an argument of the func command is not executed.

While the basic structure of the F language has thus been described, the F language may be provided with further advanced features. For optimum operation of the F language, the shell preferably functions exclusively as a command interpreter. It is expected that each user executes about 100 processes when a practical F program is run. Therefore, the F program is preferably designed to avoid waste of memory resources as much as possible. Further, the flow control scheme is constituted by commands, so that a termination status of an execution result is returned to the parent process as it is.

The implementation and design of F language programs are completely different from those of the conventional shell script. The program requires variables which have predetermined data types, and is constituted by a set of functions as in C language. In the F language, the respective functions are independent of each other and have local variables, so that recursive programming can be realized. The F language serves as an interpreter language which is applicable to a wide range of applications from a low-level numerical calculation to a system control.

The present invention is not limited to the aforesaid embodiments, but may be embodied in ant other ways by properly designing a function command and a control statement command.

The present invention provides an interpreter-oriented language which allows for recursive programming of a novel implementation style, and permits a user to arbitrarily establish his own operating environment on the basis of his flexible conception. The novel language realized by the present invention can totally be implemented by a shell external command, so that an additional feature can be provided simply by creating a new external command having that feature. Accordingly, there is no need to modify the shell, an interpreter or a compiler itself, so that efforts for development can be reduced to save time required for the development. Particularly, end users can advantageously use this language for establishing their own computer environments, while developers can improve the efficiency of development. Further, there is no need to create a visual shell for providing a comprehensive GUI, but it is merely necessary to create a required portion of a front end. As a result, users can establish a transparent environment which can freely be viewed by the users.

This application is based on a patent application No. 2000-42195 filed in Japan, the content of which is incorporated hereinto by reference.

As seen in FIG. 1, a process 10 is shown which is representative of a process embodying the process flow and command interpretation.

What is claimed is:

1. A computer having an operating system including a kernel and a command interpreter installed therein, and operative to run an external command program, the kernel being operative to manage at least a file system and a memory and perform a multitasking control, the command interpreter being operative to input thereto a command character string indicative of one or more commands including external commands and interpret the command character string to execute the respective commands in the command character string in accordance with a control scheme specified by the character string, the external command program being described in an executable file stored in a predetermined directory of the file system, the program being executable by a process generated therefor by the kernel under control of the kernel, the command interpreter being implementable as one of the external commands, wherein the external commands include a function command which is executable with a file name taken as an argument, wherein, when the function command is executed with the file name taken as the argument, a process executing the function command inputs a script character string described in a predetermined format in a file specified by the file name, then converts the script character string into a command character string interpretable by the command interpreter, and newly invokes the command interpreter to output the command character string to the command interpreter.

2. A computer having an operating system including a kernel and a command interpreter installed therein, and operative to run an external command program, the kernel being operative to manage at least a file system and a memory and perform a multitasking control, the command interpreter being operative to input thereto a command character string indicative of one or more commands including external commands and interpret the command character string to execute the respective commands in the command character string in accordance with a control scheme specified by the character string, the external command program being described in an executable file stored in a predetermined directory of the file system, the program being executable by a process generated therefor by the kernel under control of the kernel, the command interpreter being implementable as one of the external commands, wherein the external commands include a function command which is executable with a function index of a predetermined format taken as an argument, wherein, when the function command is executed with the function index taken as the argument, a process executing the function command inputs a script character string describing an entity of the function index preliminarily stored in a memory accessible by the process, then converts the script character string into a command character string interpretable by the command interpreter, and newly invokes the command interpreter to output the command character string to the command interpreter.

3. A computer having an operating system including a kernel and a command interpreter installed therein, and operative to run an external command program, the kernel being operative to manage at least a file system and a memory and perform a multitasking control, the command interpreter being operative to input thereto a command character string indicative of one or more commands including external commands and interpret the command character string to execute the respective commands in the command character string in accordance with a control scheme specified by the character string, the external command program being described in an executable file stored in a predetermined directory of the file system, the program being executable by a process generated therefor by the kernel under control of the kernel, the command interpreter being implementable as one of the external commands, wherein the external commands include a function command which is executable with a file name or a function index of a predetermined format taken as an argument, wherein, when the function command is executed with the file name taken as the argument, a process executing the function command inputs a main script character string described in a predetermined format in a file specified by the file name, then converts the main script character string into a command character string interpretable by the command interpreter, and newly invokes the command interpreter to output the command character string to the command interpreter, wherein, when the function command is executed with the function index taken as the argument, a process executing the function command inputs a function script character string describing an entity of the function index preliminarily stored in a memory accessible by the process, then converts the function script character string into a command character string interpretable by the command interpreter, and newly invokes the command interpreter to output the command character string to the command interpreter.

4. A computer as set forth in claim 3, wherein the main script character string and the function script character string can be written in a file specified as the argument of the function command, and a command name of the function command can be described in these script character strings with a function name defined in the function script character string being taken as the argument, wherein, when the function command is executed with the file name taken as the argument, the process executing the function command requests the kernel to allocate a shared memory for interprocess communication, and stores in the allocated shared memory the function script character string described in the file specified as the argument of the function command, wherein, if the function name is described in the command character string before the command character string is outputted to the newly invoked command interpreter, the function name is replaced with a function index of the predetermined format specifying an address of the shared memory in which the function script character string associated with the function name is stored.

5. A computer as set forth in claim 3, wherein, when the function command is executed with the function index taken as the argument, the process executing the function command requests the kernel to newly allocate a shared memory for inter-process communication, copies the function script character string in the newly allocated shared memory from a shared memory allocated by the function command executed with the file name taken as the argument, converts the copied function script character string into a command character string, and outputs the converted command character string to the newly invoked command interpreter.

6. A computer as set forth in claim 3, wherein metacharacters for the command interpreter are usable in the main script character string.

7. A computer as set forth in claim 6, wherein one of the metacharacters causes the command to be executed in a background process.

8. A computer-readable storage medium containing thereon a program for a function command interpretable and executable by a command interpreter of an operating system, the function command being adapted to specify at least one argument at execution thereof, the program performing the steps of:

(1) determining whether the argument is a file name or a function index;

(2) if the argument is the file name, inputting a script character string including at least a main function portion and optionally a sub-function portion from a file specified by the file name, then converting the main function portion of the script character string into a command character string interpretable by the command interpreter and, if the sub-function portion is present in the script character string, storing the sub-function portion in a shared memory for inter-process communication, and newly invoking the command interpreter to output the command character string to the command interpreter;

(3) if the argument is the function index, reading the sub-function portion in a shared memory specified by the function index, then converting the sub-function portion into a command character string interpretable by the command interpreter, and newly invoking the command interpreter to output the command character string to the command interpreter.

9. A computer-readable storage medium as set forth in claim 8, wherein an argument to be used by a program described in the form of a script character string can additionally be described in the file name or the function index serving as the argument of the function command.

10. A computer-readable storage medium as set forth in claim 8, wherein the function command has a return value transferable to the command interpreter.

11. A computer-readable storage medium as set forth in claim 8, wherein a function name describable in the script character string can be defined in the subfunction portion, wherein the program for the function command further performs the step of, if the function name is described in the command character string before the command character string is outputted to the newly invoked command interpreter, replacing the function name with a function index of a predetermined format specifying an address of the shared memory in which a function script character string associated with the function name is stored.

12. A computer-readable storage medium as set forth in claim 8, wherein the program for the function command, if the argument is the function index, reads the sub-function portion in the shared memory specified by the function index, newly allocates a shared memory to copy the read sub-function portion in the newly allocated shared memory, converts the sub-function portion into a command character string interpretable by the command interpreter, and newly invokes the command interpreter to output the converted command character string to the command interpreter.

* * * * *